(12) United States Patent
Sempel

(10) Patent No.: US 7,382,339 B2
(45) Date of Patent: Jun. 3, 2008

(54) LED CAPACITANCE DISCHARGE WITH LIMITED CURRENT

(75) Inventor: Adrianus Sempel, Eindhoven (NL)

(73) Assignee: Koninklijke Philips Electronics N. V. (NL)

( * ) Notice: Subject to any disclaimer, the term of this patent is extended or adjusted under 35 U.S.C. 154(b) by 187 days.

(21) Appl. No.: 10/514,286

(22) PCT Filed: Apr. 22, 2003

(86) PCT No.: PCT/IB03/01554

§ 371 (c)(1),
(2), (4) Date: Nov. 12, 2004

(87) PCT Pub. No.: WO03/098974

PCT Pub. Date: Nov. 27, 2003

(65) Prior Publication Data

US 2005/0225516 A1    Oct. 13, 2005

(30) Foreign Application Priority Data

May 16, 2002   (EP)   ................................. 02076908

(51) Int. Cl.
*G09G 3/10* (2006.01)
*G09G 3/30* (2006.01)
(52) U.S. Cl. ..................................... 345/76; 315/169.3
(58) Field of Classification Search ................. 345/76, 345/77, 80, 204, 87; 315/169.1–169.4
See application file for complete search history.

(56) References Cited

U.S. PATENT DOCUMENTS

| 4,099,171 | A | * | 7/1978 | Meyer | .......................... 345/46 |
| 5,095,248 | A | * | 3/1992 | Sato | ........................ 315/169.3 |
| 5,719,589 | A | * | 2/1998 | Norman et al. | ................ 345/82 |
| 5,723,950 | A | * | 3/1998 | Wei et al. | ................. 315/169.3 |
| 5,828,181 | A | * | 10/1998 | Okuda | ...................... 315/169.3 |
| 5,923,309 | A | * | 7/1999 | Ishizuka et al. | ............... 345/82 |
| 6,201,520 | B1 | * | 3/2001 | Iketsu et al. | ................... 345/76 |
| 6,351,255 | B1 | * | 2/2002 | Ishizuka et al. | ............... 345/77 |
| 6,369,516 | B1 | * | 4/2002 | Iketsu et al. | ............. 315/169.3 |
| 6,407,732 | B1 | * | 6/2002 | Stiens et al. | ................. 345/204 |
| 6,778,154 | B2 | * | 8/2004 | Van Velzen | .................. 345/76 |
| 2003/0076048 | A1 | * | 4/2003 | Rutherford | ............... 315/169.3 |
| 2004/0041763 | A1 | * | 3/2004 | Kodama et al. | ............... 345/87 |

FOREIGN PATENT DOCUMENTS

JP    P02328651    11/2002

* cited by examiner

*Primary Examiner*—Amr A. Awad
*Assistant Examiner*—Stephen G Sherman
(74) *Attorney, Agent, or Firm*—Venable LLP; Raymond J. Ho

(57) ABSTRACT

This invention relates to a driver (10') for light emitting devices with an associated capacitance, comprising:—a first switch (S2') coupled to a first terminal (11a') of a light emitting device (11') included in a two dimensional array of light emitting devices, the first switch (S2') being coupled for allowing discharging of the associated capacitance (12') of the light emitting device (11') upon closing of the first switch (S2'); and—a current limiting circuit (31) coupled to the first switch (S2') and to a reference voltage for discharging the associated capacitance (12') with a limited current. Further, the current limiting circuit (31) comprises a first discharge circuit (50) and a second discharge circuit. As a result, the discharge current is controlled in an efficient manner during discharging of the associated capacitance (12').

3 Claims, 2 Drawing Sheets

LED CAPACITANCE DISCHARGE WITH LIMITED CURRENT

The present invention relates to a driver for light emitting devices and more specifically to current driving of current activated light emitting devices. The invention also relates to a display device comprising the driver.

Today, the use of light emitting device (LED) arrays as an image source in image displays is emerging, especially in applications where size is crucial such as cellular or portable telephones, pagers, etc. Organic LEDs are lightweight and thin and have a number of inherent qualities that are well suited to such applications, i.e. they have a high brightness at a low drive voltage and a long operating lifetime. Further, polymer LEDs are easy to process. Also, small molecule organic LED arrays are ideally suited for use in such applications. They are capable of generating sufficient light for use in displays under a variety of ambient light conditions. Further, organic LEDs can be fabricated in a variety of sizes. Another advantage with organic LEDs is that their emissive operation provides a very wide viewing angle.

The major problem with LEDs and especially organic and polymer LEDs is the associated capacitance, which includes internal capacitance produced by the overlaying layers of material and conductors and capacitance produced by the row and column conductors in an array. The fact that organic and polymer LEDs are current driven devices, i.e. emit light due to current flowing through them, contributes to this problem. However, voltage driven devices, such as LCDs, also suffer from this problem.

When the line time or the light producing time of an organic or a polymer LED is over, the operating voltage of the LED is switched to ground or any other reference level. Consequently, the associated capacitance is rapidly discharged, which will produce a large discharge peak current. The resulting voltage ripple causes undesirable signal spikes on the internal nodes within the driver circuit. As a result, uncontrollable substrate currents occur in the driver electronics. Due to capacitive coupling within the display, any remaining voltage ripple on the drivers is also transferred to pixels (LEDs) which are still in the ON-state, i.e. still producing or emitting light. This causes undesirable modulation of the light output.

Therefore, it would be beneficial to provide an improved driving apparatus for small molecule organic and polymer LED arrays, by means of which the problems associated with the uncontrolled discharging of the LEDs can be overcome.

It is an object of the invention to provide a driver that overcomes the problems discussed above, and which can be used at small molecule organic arrays as well as at polymer LED arrays. The invention is defined by the independent claims. The dependent claims define advantageous embodiments.

According to a first aspect of the present invention, there is provided a driver for light emitting devices with an associated capacitance, comprising: a first switch connected to a first terminal of the light emitting device included in a two dimensional array of light emitting devices, the first switch being coupled for allowing discharging of the associated capacitance of the light emitting device upon closing of the first switch, and a current limiting circuit coupled to the first switch and to a reference voltage for discharging the associated capacitance with a limited current.

According to a second aspect of the invention, there is provided a display device comprising the driver and a two-dimensional array of light emitting devices. The device can be a display module. The device can also be a display apparatus comprising the display module mounted in a housing.

The solution according to the invention provides several advantages over the technique used at present. For example, by discharging a light emitting device with a limited discharge current undesirable signal spikes on the internal nodes within the driver circuit are prevented. By virtue thereof, uncontrollable substrate currents occurring in the driver electronics are avoided. Furthermore, undesired modulation of the light output of the light emitting device is suppressed. This is due to the fact that voltage ripple on the drivers is prevented by this discharge with a limited current.

According to the present invention, the current limiting device comprises a first current path. The first current path includes a first discharging circuit having a positive resistance value and being connected to the first switch, the positive resistance value being selected to limit the current during discharging of the associated capacitance. In this case, a long RC time is achieved. The RC time is the discharge time or, in other words, the time elapses from the moment discharging is initiated until the column voltage of the light emitting device has reached a reference level, which can be a ground level. By changing the positive resistance value, the level of the discharge current and the RC time can be modified.

In a preferred embodiment of the invention, the first discharge circuit includes a first discharge switch having an internal resistance. Thus, the series resistance of said first discharge switch itself, i.e. the internal resistance, can be adapted to the components of the LED in order to obtain the requested operation of the discharging circuit; for example, the discharge time can be efficiently controlled.

Preferably, said first discharge switch of the first discharge circuit is a field effect transistor.

Alternatively, the first discharge circuit includes a resistor.

According to a preferred embodiment of the present invention, the current limiting circuit comprises a second current path including a second discharge circuit. The second discharge circuit is connected to the first switch and to the light emitting device and includes: a second resistor connected to the first switch and to the light emitting device, and a second discharge switch coupled to the second resistor and to the reference voltage.

Advantageously, the second discharge switch is arranged to be activated after the closing of the first switch. Said second discharge switch is activated after the discharge of the associated capacitance is initiated.

Preferably, the second discharge switch is arranged to be activated when the discharge current has reached a predetermined value, which value is lower than the value of the initial discharge current.

In other words, the predetermined current value is significantly lower than the initial discharge current, i.e. the peak current. At this point, the anode voltage of the light emitting device has been significantly reduced and, hence, it is possible to rapidly reduce the present anode voltage to ground level without causing any undesirable signal spikes or uncontrollable substrate current. In addition, the total discharge time of the associated capacitance of the light emitting device can be reduced.

Preferably, the two dimensional array of light emitting devices is a two dimensional array of small-molecule organic light emitting devices or a two dimensional array of polymer light emitting devices. Alternatively, the two-dimensional array can have any shape required for a multiplexed segmented display.

These and other aspects of the invention will be apparent from and elucidated with reference to the embodiments described hereinafter.

The invention will now be described in more detail with reference to non-restrictive embodiments as illustrated in the drawings, in which.

Figure 1:
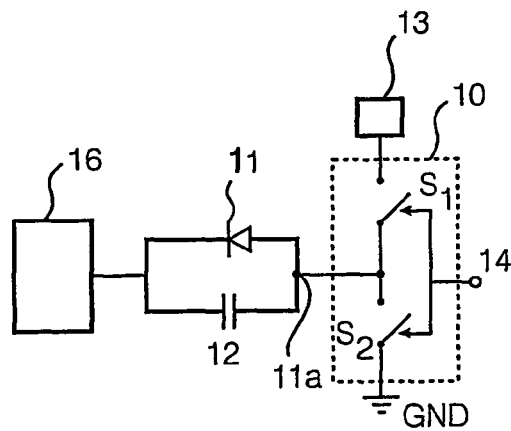
FIG. 1 is a schematic diagram of a driver and a light emitting device.

In FIG. 1 a schematic diagram of a driver 10 and a light emitting device (LED) 11 having an associated capacitance is shown in order to illustrate the problems that arise when a light emitting device (LED) 11 having an associated capacitance is rapidly discharged. The LED 11 has an associated capacitance 12, which includes internal capacitance and any capacitance in the electrical connections between the LED 11 and the driver 10, etc. In the present example, the LED 11 is an organic light emitting device with internal capacitance due to overlaying layers of material sandwiched between electrical conductors. Further, the LED 11 is a pixel in a two dimensional array of pixels, and column and row conductors add some capacitance to the device. The pixel can have a regular, repetitive shape or any shape required for multiplexed segmented displays, like a shape required for icons.

The driver 10 is connected to the LED 11, which is represented as a single light emitting diode although additional LED's may be incorporated in a single pixel for redundancy or color. In this embodiment, the driver 10 is a column driver for the two dimensional array of pixels and each column, or group of columns, in the two dimensional array includes a similar driver. The driver 10 includes a first switch $S_2$ and a second switch $S_1$. The second switch $S_1$ is connected between a power source 13 (being a voltage source, current source or a current limiting device such as a resistor) and an anode terminal 11a of the LED 11, and the first switch $S_2$ is connected between ground GND (or a reference voltage) and the anode terminal 11a The switches $S_1$ and $S_2$ each have a control terminal connected to receive a column logic or address signal from an input terminal 14 when the column containing the LED 11 is being addressed. Alternatively, the switches can be controlled by different logic or signals (not shown). By virtue thereof both the first switch $S_2$ and the second switch $S_1$ can be turned off during part of the switching cycle. During this time the capacitance 12 is discharged via LED 11. This discharge generates additional light, thereby improving the efficiency. A row driver 16 is connected to the LED 11 and includes a third switch (not shown) and a fourth switch (not shown), normally working in anti-phase. Each row, or group of rows, in the two dimensional array includes a similar driver. Further, third and fourth switches each have a control connected to receive a row logic or address signal from an input terminal (not shown).

The switches $S_1$ and $S_2$ can be constructed in a conventional way. For example, each of the switches may be formed by a single N or P channel type transistor, or a combination of N and P channel type transistors. Since such components and the design of such components are known to persons skilled in the art, it will not be explained further herein.

Figure 2:
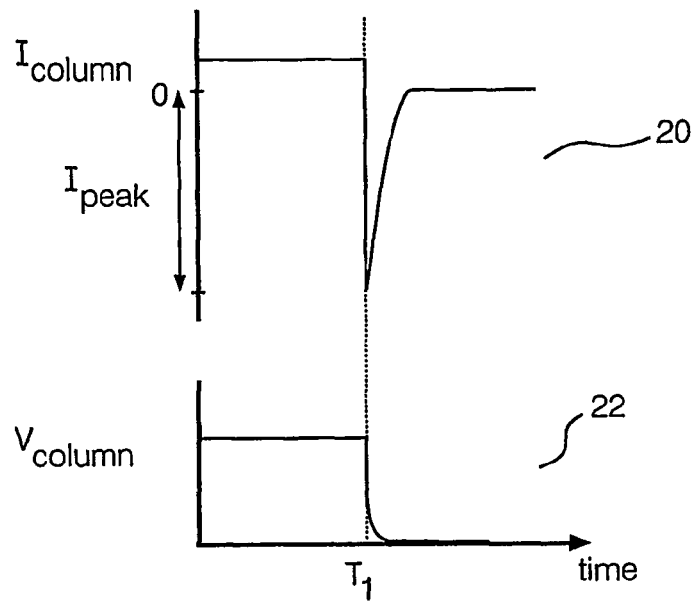
FIG. 2 is a graphical representation of current and voltage waveforms at various points in the circuit of FIG. 1.

In operation, during the light production of the LED 11, the voltage at the anode terminal 11a of the LED 11 is $V_{column}$ and a current $I_{column}$ flows through the LED 11, generally illustrated by waveform 22 and 20, respectively, in FIG. 2. At the end of a light emission period of the LED 11, i.e. at the end of the column logic signal (generally a positive square wave), the second switch $S_1$ is turned OFF or opened and the first switch $S_2$ is turned ON or closed, thereby connecting LED 11 to ground or a reference voltage. When the high anode voltage, i.e. $V_{column}$, is switched to ground at time $T_1$, the associated capacitor rapidly discharges through the first switch $S_2$. However, all the other (non selected) pixels included in the same column are discharged. As a result, a large peak current $I_{peak}$ will flow in the circuit, generally illustrated by waveform 20 in FIG. 2, and the anode voltage $V_{column}$ rapidly decreases to ground or a reference level, generally illustrated by waveform 22 in FIG. 2. As mentioned above, this peak current will cause, for example, substrate currents in the driver electronics.

Figure 3:
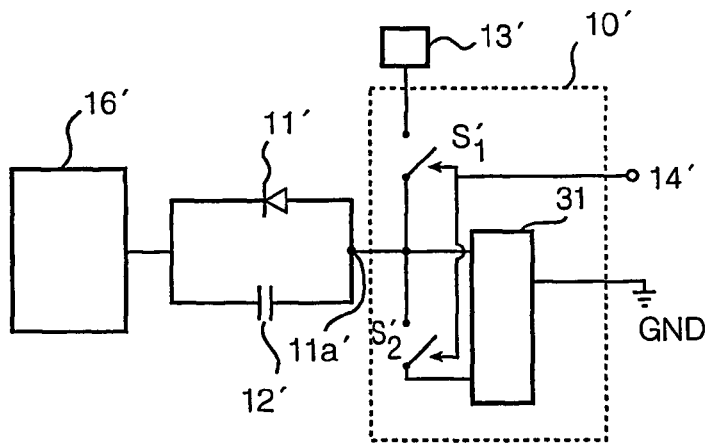
FIG. 3 is a circuit diagram of a driver embodying the invention in a basic form.

In FIG. 3, a block diagram which is illustrative of certain principles of the invention is shown. In this embodiment, and in other embodiments disclosed herein, components which are similar to those used in FIG. 1 bear the same reference numerals and a prime is added to indicate the different embodiment. Further, only the operations of the circuits which are different from the operations of the circuit of FIG. 1 will be described in detail.

A driver 10' is provided which includes a current limiting circuit 31. The driver 10' is connected to a power source 13'. The current limiting device 31 is connected to a second switch $S_1'$, a first switch $S_2'$, a light emitting device 11' and to a reference voltage, which can also be a ground GND. Thus, a discharge of an associated capacitance 12' with a limited current is made possible. The design or construction of the second switch $S_1'$ and the first switch $S_2'$ is similar to the design of the switches $S_1$ and $S_2$. As described above, each of the switches $S_1'$ and $S_2'$ has a control terminal connected to receive a column logic or address signal from an input terminal 14' when the column containing LED 11' is being addressed. Furthermore, the LED 11' is connected to a row driver 16'.

Figure 4:
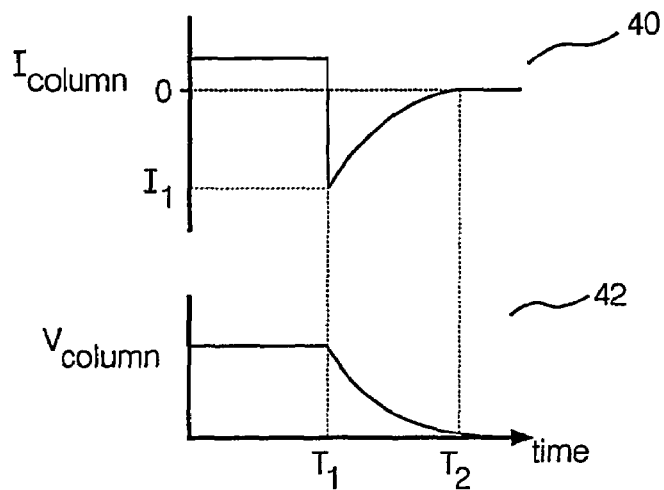
FIG. 4 is a graphical representation of current and voltage waveforms at various points in the circuit of FIG. 3.

In operation, at the end of a light emission period of the LED 11', indicated by time $T_1$ in FIG. 4, the second switch $S_1'$ is turned OFF or opened and the first switch $S_2'$ is turned ON or closed and, thus, the LED 11' is connected to ground GND. The high anode voltage, i.e. $V_{column}$, is switched to ground GND, generally illustrated by waveform 42 in FIG. 4, and the associated capacitor slowly discharges through the first switch $S_2'$ and the current limiting circuit 31. Thereby, the associated capacitance is discharged with the current $I_{column}$, which is limited to a value $I_1$, and the discharge time, indicated by time $T_2$-$T_1$, is prolonged, generally illustrated by waveform 40 in FIG. 4. $T_2$ indicates the point where the associated capacitance is discharged or the point where the column voltage $V_{column}$ has reached ground level.

Figure 5:
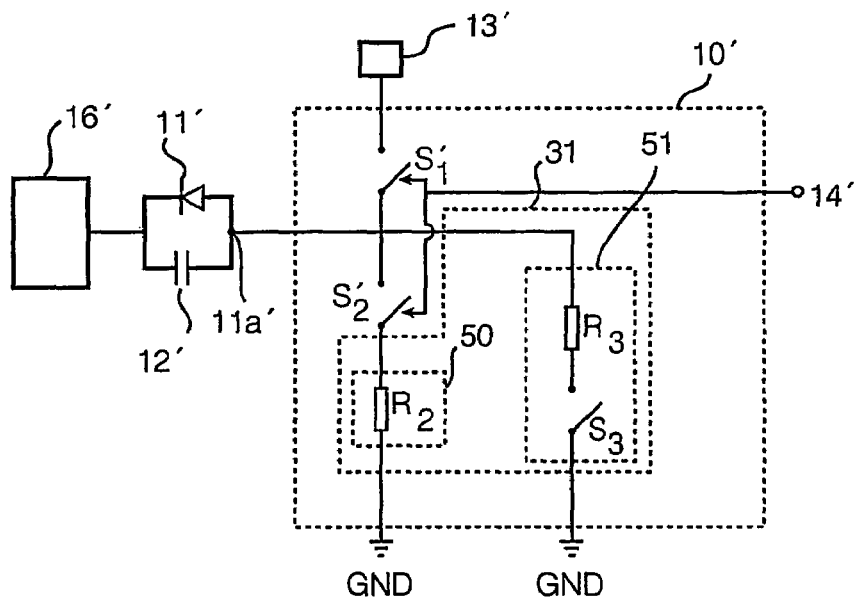
FIG. 5 is a schematic diagram of an embodiment of a driver and a light emitting device in accordance with the present invention.

Referring now to FIG. 5, an embodiment of a driver according to the present invention will be shown. The current limiting circuit 31 includes a first discharge circuit 50 and a second discharge circuit 51 connected in parallel with first discharge circuit 50. The first discharge circuit 50 comprises a first current path and the second discharge circuit 51 comprises a second current path. Preferably, the first discharge circuit 50 comprises a resistor $R_2$ connected to the first switch $S_2'$ and to ground GND. Thus, in this case, the first current path is defined by the resistor $R_2$. Preferably, the second discharge circuit 51 comprises a resistor $R_3$ and another discharge switch $S_3$. One end of the resistor $R_3$ is connected to the second switch $S_1'$, the first switch $S_2'$ and an anode terminal $11a'$ and the other end of resistor $R_3$ is connected to the other switch $S_3$. Further, the other switch $S_3$ is coupled to ground GND. Thus, in this case, the second current path is defined by the resistor $R_3$ and the other switch $S_3$. The other switch $S_3$ can be constructed in a similar way as the first and second switches $S_2$ and $S_1$. Furthermore, the LED 11' is connected to a row driver 16'.

Figure 6:
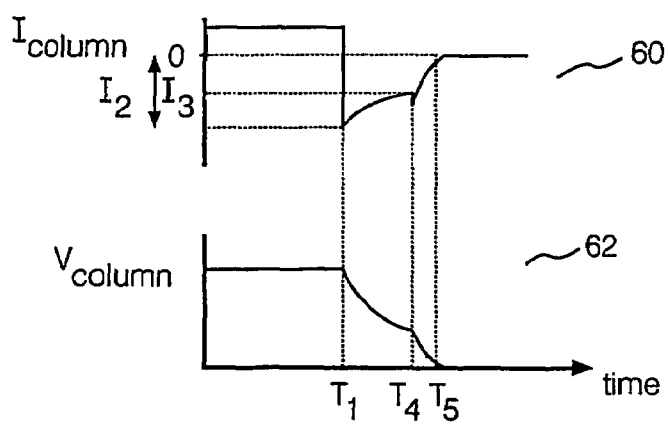
FIG. 6 is a graphical representation of current and voltage waveforms at various points in the circuit of FIG. 5.

In operation, at the end of a light emission period of the LED 11', indicated by time $T_1$ in FIG. 6, the second switch $S_1'$ is turned OFF or opened and first switch $S_2'$ is turned ON or closed and, thus, the LED 11' is connected to ground GND via the first current path. The high anode voltage, i.e. $V_{column}$, is switched to ground GND via the resistor $R_2$ and the associated capacitor 12' is slowly discharged through the first switch $S_2'$ and the resistor $R_2$, generally indicated by waveform 62 in FIG. 6. Thus, the associated capacitance 12' is discharged with the current $I_{column}$, which is limited to a value $I_2$, generally indicated by waveform 60 in FIG. 6. When the discharge current has been reduced to a low value, indicated by $I_3$ in FIG. 6, the other switch $S_3$ is activated, which is indicated by time $T_4$. At this point, the anode terminal $11a'$ is also connected to ground GND via the second current path, i.e. via the resistor $R_3$ and the other switch $S_3$. In other words, at the point $T_4$ the two parallel current paths connect the anode terminal $11a'$ to ground GND, which results in a rapid reduction of the remaining anode voltage to ground level. Accordingly, the total RC time is reduced, generally indicated by waveforms 60 and 62 in FIG. 6. This activating of the other switch $S_3$ also results in a second peak current at time $T_4$, as can be seen in FIG. 6. However, since the anode voltage is significantly reduced compared to the initial voltage at the point when the other switch $S_3$ is activated, the resulting peak current, i.e. the second peak current, will be low and, thus, no undesirable signal spikes or uncontrollable substrate current will be caused. Finally, at time $T_5$, the anode voltage is reduced to ground level and, accordingly, the associated capacitance 12' is discharged.

The activation of the other switch $S_3$ may be accomplished by connecting a control terminal (not shown) of the other switch $S_3$ so as to receive the logic square wave supplied to the second switch $S_1'$ and the first switch $S_2'$ via a delay circuit. As an alternative, a voltage sensing circuit (not shown) may be connected to the LED 11' for sensing the anode voltage of LED 11' and for supplying, upon sensing a predetermined anode voltage, an activation signal to the control terminal of the other switch $S_3$ so as to activate the other switch $S_3$. Alternatively, a current sensing circuit (not shown) may be connected to the LED 11' for sensing the discharge current of LED 11' and for supplying, upon sensing a predetermined discharge current, the activation signal to the control terminal of the other switch $S_3$ so as to activate the other switch $S_3$.

Furthermore, the other switch $S_3$ may be activated at the end of the selected line time, i.e. the time when all pixels are to be switched-off, at the same time that first switch $S_2'$ is turned ON, in order to obtain a faster discharge time. In this case, the undesirable effects originating from a rapid discharge will not cause any harm to the light emissions, such as unwanted modulation of the light output of other pixels included in the array.

A consequence of a fixed value of the resistance of the first discharge circuit 50, i.e. the resistor $R_2$, is that the discharge current depends on the actual column voltage $V_{column}$. To avoid this, a switch having an internal resistance, for example a FET, can be used instead of the resistor $R_2$ in the first discharge circuit 50.

In the above embodiments, the anode side of the pixel diode, i.e. the LED 11, is connected to the column driver and the cathode side to the row driver. However, it should be noted that they can be interchanged, which can be readily carried out by a person skilled in the art on the basis of the description of embodiments given herein.

In summary, a driver for light emitting devices with an associated capacitance, comprising: a first switch connected to a first terminal of a light emitting device included in a two dimensional array of light emitting devices, the first switch being connected for allowing discharging of the associated capacitance of the light emitting device upon closing of said first switch, and comprising a current limiting circuit connected to said first switch and to ground for discharging the associated capacitance with a limited current. Further, the current limiting circuit comprises a first discharge circuit and a second discharge circuit. As a result, the discharge current is controlled in an efficient manner during discharging of said associated capacitance.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, a number of these means can be embodied by one and the same item of hardware. The mere fact that certain measures are recited in mutually different dependent claims does not indicate that a combination of these measures cannot be used to advantage.

The invention claimed is:

1. A driver for light emitting devices with an associated capacitance, comprising:
    a first switch coupled to a first terminal of a light emitting device included in a two dimensional array of light emitting devices,
    the first switch being coupled for allowing discharging of the associated capacitance of the light emitting device upon closing of the first switch; and
    a current limiting circuit coupled to the first switch and to a reference voltage for discharging the associated capacitance with a limited current
    wherein the current limiting circuit includes:
    a first current path that includes a first discharging circuit having a positive resistance value that is coupled to the first switch,
    the positive resistance value being selected to limit the current during discharging of the associated capacitance, and a second current path including a second discharge circuit,
said second discharge circuit being coupled to the first switch and to the light emitting device, the second discharge circuit including;
a second resistor;
another discharge switch coupled in series with the second resistor; and
the series connection of the second resistor and the other switch being coupled between the light emitting device and the reference voltage.

2. The driver of claim 1, wherein the other switch is arranged to be activated after the closing of the first switch.

3. The driver of claim 2, wherein the other switch is arranged to be activated when the discharge current has reached a predetermined value, which value is lower than the value of the initial discharge current.

* * * * *